Figure 5:
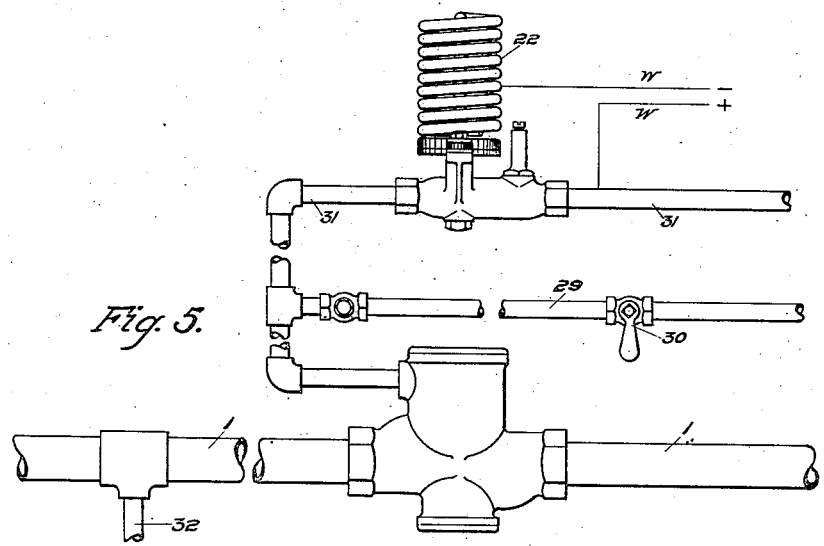

No. 868,307. PATENTED OCT. 15, 1907.
G. W. WACKER.
THERMOSTATIC APPLIANCE.
APPLICATION FILED APR. 2, 1906.
3 SHEETS—SHEET 1.
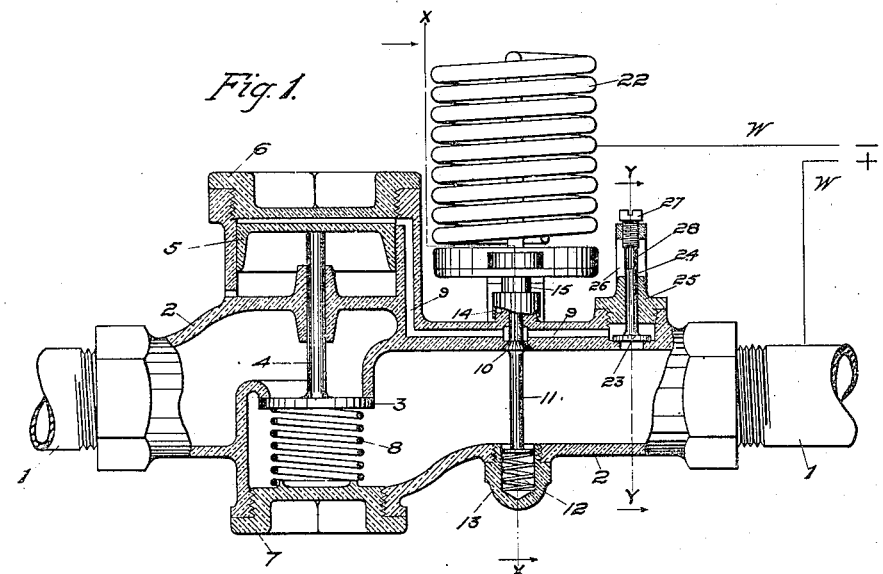
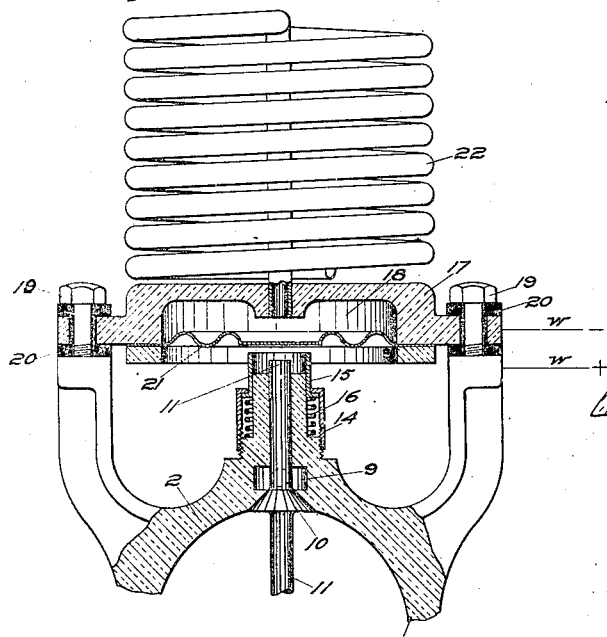
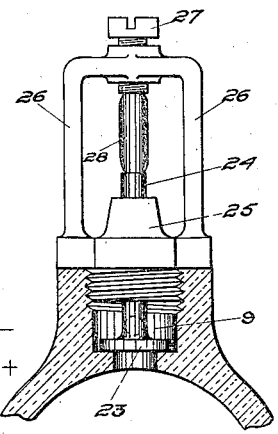
WITNESSES:
M. F. Keating
E. E. Trust
INVENTOR
George W. Wacker
BY
Charles J. Kintner
ATTORNEY

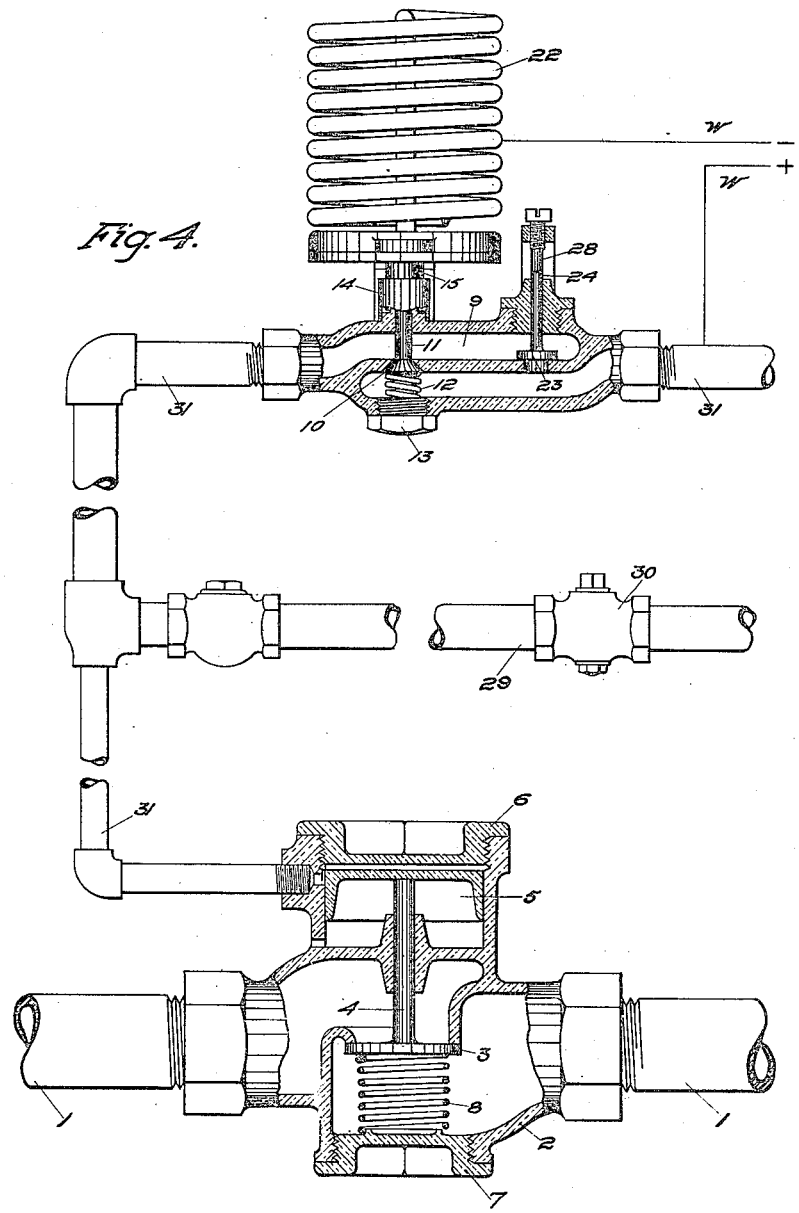

No. 868,307. PATENTED OCT. 15, 1907.
G. W. WACKER.
THERMOSTATIC APPLIANCE.
APPLICATION FILED APR. 2, 1906.

3 SHEETS—SHEET 3.

WITNESSES:
M. F. Keating
E. E. Trust

INVENTOR
George W. Wacker
BY
Charles J. Kintner
ATTORNEY

UNITED STATES PATENT OFFICE.

GEORGE W. WACKER, OF YONKERS, NEW YORK.

THERMOSTATIC APPLIANCE.

No. 868,307.　　　　Specification of Letters Patent.　　　　Patented Oct. 15, 1907.

Application filed April 2, 1906. Serial No. 309,364.

*To all whom it may concern:*

Be it known that I, GEORGE W. WACKER, a citizen of the United States, residing at Yonkers, county of Westchester, and State of New York, have made a new and useful Invention in Thermostatic Appliances, of which the following is a specification.

My invention is directed particularly to improvements in thermostatic appliances combined with fire extinguishing systems wherein the thermostat is caused to actuate a main operating valve of the differential type in such manner as to release water under pressure for various purposes, and it has for its objects, first, to combine with a thermostat and a differential operating valve a pilot or supplemental valve in such manner that the thermostat will, when sufficiently heated, cause the operating valve to be actuated through the differential action of a liquid flowing through a by-path and maintain said operating valve open so long as the thermostat is heated beyond a predetermined temperature. Second, to combine with such an apparatus an automatic alarm in such manner that the alarm will be sounded at a predetermined temperature before the pilot or supplemental valve is actuated. Third, to provide a thermostatically controlled operating valve which will be quickly returned to its closed position when the temperature which operates the thermostatic control valve falls below that for which it is designed to operate and in such manner as to quickly and effectually cut off the flow of water. Fourth, to combine with such a controlled operating valve and thermostat, an additional thermostatically controlled pilot or supplemental valve which will, for abnormal temperatures beyond that determined for the first thermostat, cause the operating valve to be maintained continuously in open position. Fifth, to combine with a system of thermostatically controlled valves which release volumes of water, means for manually effecting a distribution of water either in the same room or apartment where the automatically controlled valves are located, or in an adjoining or other rooms or apartments where an emergency may require such action. Sixth, to combine with a main service or water supply pipe an auxiliary service or water supply pipe and a thermostatically controlled valve; together with an emergency water supply pipe, all so arranged that an individual volume of water may be released by an abnormal temperature by the thermostatically controlled valve, or the same may be done manually in an emergency.

Figure 6:
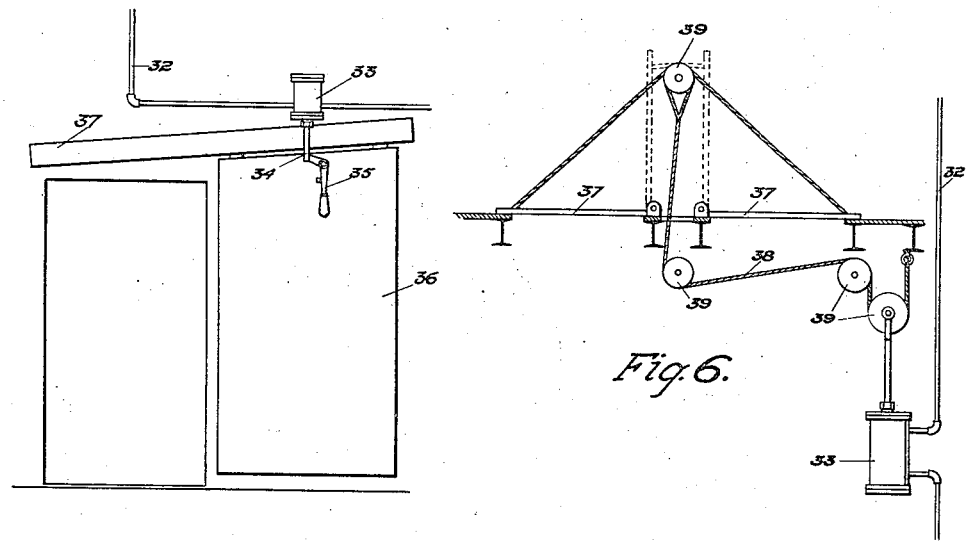

My invention will be fully understood by referring to the accompanying drawings, in which, Figure 1 is a full sized part sectional, part side elevational view illustrating its application to a water pipe and illustrating also electrical conductors connected thereto for effecting an alarm through the agency of an electric battery and a well known form of alarm, not shown. Fig. 2 is an enlarged sectional view taken through Fig. 1 on the broken line *x—x* and as seen looking thereat from left to right in the direction of the arrows; and Fig. 3 is a similar enlarged part side elevational, part sectional view taken through Fig. 1 on the broken line *y—y* and as seen looking thereat from left to right in the direction of the arrows. Fig. 4 is a similar view illustrating the application of my improvement in a practical manner and showing also an emergency appliance for manually releasing a valve or series of valves in a room or series of rooms. Fig. 5 is a side elevational view illustrating the subject matter shown in Fig. 4 and also its application to the release of a firedoor, as shown below on the left. Fig. 6 is a side elevational view illustrating the application of my invention to the raising or opening of transoms, ventilators, doors, or the like, in theaters, public bulidings, or similar places, the doors being shown in open position in dotted lines.

My invention contemplates preferably the use of a confined expansible liquid, such as a mineral oil, for thermostatically controlling the movement of the operative parts of the valve control apparatus, and although the use of expansive oils has heretofore been contemplated for effecting the operation of thermostatic devices, in most instances, so far as I am aware, such arrangements have been of such a nature as to preclude their use in rooms where such devices present an unsightly appearance, as in hotels, art galleries, private residences, etc. Electrical alarms have also been combined with such devices, but in so far as I am aware, such alarms have always been so constructed or arranged as to be actuated at the same time that the water has been released or turned on by the thermostat, thereby often effecting a serious damage from the water by reason of a false alarm; or in cases where the thermostats have operated at temperatures less than that which produce conflagration.

My invention is designed to overcome these serious defects and also to immediately effect the closure of the differential operating valve should the temperature fall below that for which the thermostat was designed to operate, thereby avoiding damage attributable to the release of water when not required.

My invention also contemplates the use of an additional thermostatic device designed to operate for abnormally high temperatures or beyond that for which the thermostat which starts the first operating valve is set to operate. In other words, should the temperature be sufficient to destroy the thermostat which operates the first pilot or supplemental valve, then the second thermostatic device will be actuated and in such manner as to leave the operating valve permanently open. Also under certain conditions a conflagration becomes greater than can be checked by the ordinary thermostatically controlled appliances in a room or series of rooms, and for overcoming this imperfection in existing systems I have devised emergency apparatus whereby any person may manually release a sufficient volume or volumes of water to check the conflagration.

Referring now to the drawings for a full and clear understanding of the invention, such as will enable others skilled in the art to construct the same, and first to Figs. 1 to 3 inclusive, 1 represents a service or water supply pipe and 2 a union or junction between two parts of said pipe, which union or junction is cast in substantially the conformation shown so as to afford seats for the valves and the operative parts to be later described.

3 and 5 indicate the opposing parts of a differential operating valve connected together by a stem 4.

6 and 7 are screw-threaded heads or caps, the former closing the cylinder in which the part 5 is located and the latter affording a seat for a valve closing spring 8 beneath the differential operating valve.

9 is a by-path for conveying water into the cylinder behind the part 5.

10 is a pilot or supplemental control valve for admitting water into said by-path, said valve being provided with a stem 11 which is supported at its lower end by a seating or closing spring 12 in a screw-seated cup 13, the arrangement being such that normally the valve is seated and the by-path 9 closed.

14 is a screw-threaded adjusting cup and 15 a sliding contact sleeve having a shoulder for yieldingly securing it within said cup and against the action of a spring 16.

17 is a metallic cup having a chamber 18, said cup being secured in the manner shown by bolts or screws 19 extending through insulating spools 20 and into upwardly extending arms from the union 2.

21 is a corrugated metallic diaphragm which is secured to the under side of the cup 17 by a metallic ring in the manner shown and 22 is a metallic tube preferably coiled, as shown, and having relatively large heat absorbing capacity. This tube is connected at one end directly to the chamber 18 and has its other end sealed after it and the chamber have been wholly filled with some expansible liquid, preferably a mineral oil. The central portion of the corrugated diaphragm 21 is flattened so as to afford a good electrical contact with the upper end of the sliding contact sleeve 15, the arrangement being such that when said diaphragm and sleeve contact an electrical circuit is closed through the conductors $w$, $w$, to an alarm apparatus, not shown.

23 is a second supplemental control valve having a stem 24 extending upward through a seat 25 screw-threaded to the union 2, said valve being seated as shown in an inlet from the union to the by-path 9.

26, 26, are upwardly extending arms from the seat 25 and 27 is a set-screw located in alinement with the valve-stem 24.

28 is a short body of fusible material constituting in effect a second thermostat and designed to fuse for temperature relatively much greater than that designed to operate the thermostatic device hereinbefore described, said fusible body being held in place between the upper end of the valve-stem 24 and the lower end of the set-screw 27.

The operation of the apparatus so far described is as follows—the inlet end of the pipe at the right of Fig. 1 being connected to a source of water supply, such as is usually found in buildings, and the outlet end thereof on the left being connected to a sprinkler or hose connection, or any other well known operative part or parts, all seated, as shown, it being understood that the thermostatically controlled device is adapted to operate for a predetermined temperature should a fire occur; or should any abnormal temperature for which the apparatus is designed to work be reached the liquid in the thermostatic device causes the diaphragm 21 to be moved downward a definite distance until it comes into electrical and mechanical contact with the sliding contact sleeve 15. At this time the circuit is therefore closed from the battery and alarm, not shown, through the union 2, contact sleeve 15, diaphragm 21, chamber 18, by conductor $w$, back to the battery, thereby sounding an alarm. It will be noted that this alarm will be sounded before any mechanical effect is had upon the valve stem 11, as this can only be operated by a further descent of the diaphragm 21, and the time between which such results may take place may be such as to enable a watchman or other authorized person to reach the point where the alarm is turned in before the water is turned on and to actuate a cock between the valve and the sprinkler, so as to prevent any outflow of water into the room, in the event of a false alarm. If, however, the water is not turned off at this cock, as the diaphragm 21 descends still further it ultimately comes into mechanical contact with the upper end of the valve stem 11 finally unseating the pilot or supplemental control valve 10 so that water now flows by way of the by-path 9 into the cylinder behind the part 5 of the differential operating valve quickly causing the same to descend and with it the part 3 of the valve against the pressure of the seating spring 8 and the water in the pipe 1, so that water now flows to the sprinklers or other point of service so long as the thermostat is heated to the operating temperature. Should the conflagration cease the immediate cooling of the thermostat causes the diaphragm to be restored to its normal position, the pilot or supplemental control valve to be seated under the action of the seating spring 12, and finally the discontinuance of the alarm by reason of an interruption of the circuit between said diaphragm and the sliding contact sleeve 15. It will be apparent, therefore, that on a discontinuance of the abnormal temperature the differential operating valve is quickly seated or restored to its normal position under the joint influence of the spring 8 and the water flow through the service or water supply pipe 1; hence, the flow of water is discontinued. It will be apparent that the time element may be varied at will by reason of the adjustable cup 14 and spring 16. It sometimes occurs in connection with the use of thermostatic appliances that by reason of excessive heat the thermostat itself is destroyed. Under such conditions the action of the spring 12 in my novel form of safety appliances would seat the valve 10 and thereby cut off the water flow at a time when it is most needed. For the purpose of preventing any such possible discontinuance of water flow I have devised a further safety appliance in the nature of a second supplemental control valve 23 which is, as before stated, normally held in its seated position through the agency of a thermostat or fusible body 28 and set-screw 27. This body 28 is designed to be fused for excessive temperatures, such as would probably seriously injure or destroy the tube 22, or the diaphragm of the chamber 18. As soon, therefore, as the body 28 is fused the valve 23 is unseated by the action of the water in the service or water supply pipe 1 so that even though the pilot or supplemental valve 10 be seated by reason of the destruction of the thermostat the differential main operating valve will still remain unseated by reason of the flow of water through the by-path 9, due to the unseating of the second control valve 23.

Although I have shown the two control valves 10 and 23 and their operative connections in a union 2 between the conjoint ends of two sections of tubing or pipe, obviously these parts might be located at any desired distance from the main operating valve, and the water, gas, air, steam or other operating agency conveyed from said valves to the main valve through an independent by-path, pipe or tube, and this feature I regard as important, in that it enables me to locate the thermostatically controlled valve or valves at points widely separated, if desired, the advantages of which will be apparent to those skilled in the art.

In Fig. 4 of the drawings I have illustrated the application of my improvement in a practical manner to an emergency device for primarily testing all of the sprinklers or for enabling water to be released manually from various points throughout a building. This emergency appliance consists of a supplemental pipe 29 connected with the water pipe 31 in a by-path circuit around the thermostatically controlled valve, 30 being a cock which may be manually opened at any time so as to thereby allow water to flow directly to the water supply pipe 31, and hence into the operating cylinder behind the piston 5, so as to unseat the valve 3 in the main service or supply pipe.

In Fig. 5 I have shown the application of my invention to the releasing of a fire-door 36. The upper portion of this figure of the drawings is substantially like that shown in Fig. 4 and the lower portion thereof is connected by a pipe 32 to a cylinder 33 provided with a piston and a latch 34 extending into the path of a pivoted locking bell crank lever 35 carried by the door, the arrangement being such that when water is automatically released in the manner hereinbefore described it will flow from the main service or supply pipe 1 into the pipe 32 and ultimately into the cylinder 33, causing the latch 34 to be lifted so that the door 36 is released and allowed to roll to closed position upon the inclined support 37. This door may also be closed by opening an emergency cock in the manner hereinbefore described.

In Fig. 6 I have illustrated the application of my invention to the lifting of transoms, sky-lights, ventilators or analogous doors 37, 37, or the like, through a rope 38 and a system of pulleys 39, 39, said rope being operatively connected with a piston in a cylinder 33, as before, 32 being a pipe connected with the service pipe, the operation being obvious it being apparent that when the piston is forced downward the transoms, sky-lights, doors, or other appliances will be lifted into the position shown in dotted lines. Such an arrangement has an especial utility in connection with theaters, churches, or other public buildings, the arrangement being such in this connection that the ventilating doors or sky-lights will be automatically opened for temperatures relatively lower than that for which conflagrations are designed to operate the thermostat which controls this particular application of the water flow.

I do not limit my invention to the specific details of construction disclosed in the accompanying drawings, nor to the especial uses hereinbefore referred to, as obviously the same may be used in connection with the application of energy generally in the arts wherein it is designed to effect such application through the agency of a thermostatic device adapted to release and utilize such sources of energy, such as water, air, gas and steam, for predetermined temperatures, and my claims are generic as to all such applications.

I am aware that it has heretofore been proposed to release a supply of water through the agency of a main operating valve thermostatically controlled, in which the valve is normally held in a seated position through the agency of water flowing through a by-path and unseated when the water is released and allowed to flow into the open room or exterior air, and I make no claim hereinafter broad enough to include such a structure, my invention being limited specifically in this respect to a by-path in which the water is never allowed to escape into the open air from such by-path.

Having thus described my invention what I claim and desire to secure by Letters Patent of the United States is—

1. In a water supply system a main operating valve and two supplemental control valves, each controlled by a thermostatic device and adapted to independently effect the operation of the main valve, one for a predetermined temperature and the other for a relatively much higher temperature, substantially as described.

2. In a water supply system a main operating valve normally closed and operatively connected with two supplemental control valves each controlled by a thermostat, one of which actuates its valve for a predetermined temperature and the other for a relatively much higher temperature, substantially as described.

3. In a water supply system a service pipe; a main operating valve seated therein and operatively connected with a piston included in a by-path to the service pipe; two independent supplemental control valves normally seated, so as to close the by-path, one being provided with means as a spring for holding it seated, and each with a thermostatic device, one of which at a predetermined temperature, actuates the spring seated valve to temporarily unseat it and open the by-path, and the other at relatively much higher temperature opens the by-path, substantially as described.

4. A water supply system embracing a main operating valve and a supplemental control valve adapted to effect the operation of the main valve; in combination with a thermostatic device operatively connected to actuate the control valve and an alarm actuated by the thermostat for a predetermined temperature; the arrangement being such that the alarm is sounded for a time before the main valve is opened, substantially as described.

5. In a safety system for the protection of buildings from fire, a water service pipe, a normally closed main operating valve; a supplemental control valve; in combination with a thermostat connected to the control valve; together with an electrical alarm, a circuit and circuit connections with adjustable parts of the thermostat, whereby for an abnormal temperature an alarm is first sounded and after a definite time the main operating valve is opened and water released, and when the temperature is lowered beyond the predetermined operating temperature the main valve is closed and the alarm ultimately discontinued, substantially as described.

6. In a safety system a thermostat operatively connected with a seated valve; in combination with an adjustable contacting part and a circuit and circuit connections to an alarm, all so adjusted and arranged that the alarm may be actuated for a definite time before the valve is actuated, substantially as described.

7. In a safety system a liquid thermostat having an expansible diaphragm of conducting material; a spring seated valve with its valve stem located in front of said diaphragm, and a yielding electrical contact located between said diaphragm and the end of the valve stem; in combination with electrical conductors connected to the diaphragm and the contact and including an electrical alarm, substantially as described.

8. A thermostatic safety device embodying an expansible chamber; a spring seated valve and valve stem, and a yielding contact adapted to make contact with the diaphragm before said diaphragm touches the end of the valve stem; in combination with an electrical alarm, substantially as described.

9. A system for utilizing a source of liquid supply, under pressure, embracing a main operating valve and a control valve located in a by-path to the pipe or tube in which the main valve is seated; in combination with a thermostat adapted to actuate the control valve and means located at a relatively distant point for manually effecting the operation of the main valve, substantially as described.

In testimony whereof I have signed my name to this specification in the presence of two subscribing witnesses.

GEORGE W. WACKER.

Witnesses:
GEORGE G. WACKER,
CHARLES J. KINTNER.